(12) United States Patent
Garnett et al.

(10) Patent No.: US 11,470,860 B2
(45) Date of Patent: Oct. 18, 2022

(54) ANIMAL FEEDS CONTAINING SPECIFIC GLYCOLIPIDS

(71) Applicant: PATHWAY INTERMEDIATES LIMITED, Shrewsbury (GB)

(72) Inventors: David John Garnett, Shropshire (GB); Lloyd Cooper, Shropshire (GB)

(73) Assignee: PATHWAY INTERMEDIATES LIMITED, Shrewsbury (GB)

( * ) Notice: Subject to any disclaimer, the term of this patent is extended or adjusted under 35 U.S.C. 154(b) by 0 days.

(21) Appl. No.: 16/075,337

(22) PCT Filed: Mar. 1, 2017

(86) PCT No.: PCT/GB2017/000028
§ 371 (c)(1),
(2) Date: Aug. 3, 2018

(87) PCT Pub. No.: WO2017/149266
PCT Pub. Date: Sep. 8, 2017

(65) Prior Publication Data
US 2019/0037885 A1   Feb. 7, 2019

(30) Foreign Application Priority Data

Mar. 2, 2016   (GB) .................................... 1603596

(51) Int. Cl.
| | | |
|---|---|---|
| A23K 20/158 | (2016.01) | |
| A23K 10/12 | (2016.01) | |
| A23K 50/75 | (2016.01) | |
| A23K 20/126 | (2016.01) | |

(52) U.S. Cl.
CPC ............ *A23K 20/158* (2016.05); *A23K 10/12* (2016.05); *A23K 20/126* (2016.05); *A23K 50/75* (2016.05)

(58) Field of Classification Search
CPC ...... A23K 50/75; A23K 20/158; A23K 10/12; A23K 20/126
USPC ............................................................ 426/2
See application file for complete search history.

(56) References Cited

U.S. PATENT DOCUMENTS

| | | | |
|---|---|---|---|
| 2004/0023922 A1* | 2/2004 | Porter | A61K 31/66 514/54 |
| 2004/0171512 A1* | 9/2004 | Furuta | C11D 3/0026 510/470 |
| 2011/0177194 A1 | 7/2011 | Van Dyck et al. | |
| 2015/0112049 A1* | 4/2015 | Hirata | A23L 33/12 536/18.2 |

FOREIGN PATENT DOCUMENTS

| | | |
|---|---|---|
| CN | 102696880 A | 10/2012 |
| CN | 102696895 A | 10/2012 |

(Continued)

OTHER PUBLICATIONS

Pichot et al. Journal of Colloid and Interface Science 329 (2009) 284-2910. (Year: 2009).*

(Continued)

*Primary Examiner* — Subbalakshmi Prakash
(74) *Attorney, Agent, or Firm* — Leason Ellis LLP (57) ABSTRACT

Use of a sophorolipid in the preparation of a feed supplement for the improvement of feed efficiency in an animal. A feed supplement comprising a sophorolipid and lysolecithin mix is also provided for improving the feed conversion rate of an animal.

11 Claims, 3 Drawing Sheets

(56) References Cited

FOREIGN PATENT DOCUMENTS

| EP | 3117838 A1 | 1/2017 |
|---|---|---|
| FR | 3012725 A1 | 5/2015 |
| JP | 2010220516 A | 10/2010 |
| JP | 2012232963 A | 11/2012 |
| KR | 100572574 B1 | 4/2006 |
| WO | 0036929 A1 | 6/2000 |
| WO | 2010050413 A1 | 5/2010 |
| WO | 2014193856 A1 | 12/2014 |
| WO | 2015137357 A1 | 9/2015 |

OTHER PUBLICATIONS

International Search Report and Written Opinion in corresponding International Patent Application No. PCT/GB2017/000028, dated Jun. 21, 2017. 11 pages.

International Preliminary Report on Patentability in corresponding International Patent Application No. PCT/GB2017/000028, dated Sep. 4, 2018. 8 pages.

Li et al. "Nanoemulsion-based delivery systems for poorly water-soluble bioactive compounds: Influence of formulation parameters on polymethoxyflavone crystallization." Food hydrocolloids 27.2 (2012): 517-528.

Search Report in corresponding British Patent Application No. GB 1603596.6 dated Dec. 21, 2016. 1 page.

Baccile et al. "Unusual, pH-induced, self-assembly of sophorolipid biosurfactants." ACS nano 6.6 (2012): 4763-4776.

Van Bogaert, Inge N A et al. "Microbial production and application of sophorolipids." Applied microbiology and biotechnology vol. 76,1 (2007): 23-34. doi:10.1007/s00253-007-0988-7.

Zhou, Shuiqin et al. "Supramolecular assemblies of a naturally derived sophorolipid." Langmuir: the ACS journal of surfaces and colloids vol. 20,19 (2004): 7926-32. doi:10.1021/la048590s.

* cited by examiner

ANIMAL FEEDS CONTAINING SPECIFIC GLYCOLIPIDS

CROSS-REFERENCE TO RELATED PATENT APPLICATIONS

This application is a U.S. National Stage Application under 35 U.S.C. § 371 of International Patent Application No. PCT/GB2017/000028, filed Mar. 1, 2017, which claims the benefit of priority under 35 U.S.C. Section 119(e) of British Patent Application number 1603596.6 filed Mar. 2, 2016, both of which are incorporated by reference in their entireties. The International Application was published on Sep. 8, 2017, as International Publication No. WO 2017/149266 A1.

This invention relates to specific glycolipids for providing improved animal feeds.

TECHNICAL FIELD

It is known to supplement animal feeds with different additives to improve animal performance, for example adding specific phospholipids to the animal feed as described in WO 00/36929 or WO 94/22324. New feed additives are desired to further improve performance, such as growth of the animal. It is preferable for such feed additives to be naturally-occurring.

It is an aim of the present invention to provide novel animal feed additives that promote animal performance, particularly but not exclusively, animal growth.

SUMMARY OF THE INVENTION

Accordingly, a first aspect of the present invention provides an animal feed suitable for feeding mammals, birds and fish, the animal feed comprising at least one sophorolipid having the following general formulas (1) or (2):

(1)

(2)

wherein
R represents hydrogen or an acyl group having 1 to 4 carbon atoms;
$R^1$ represents hydrogen or an acetyl group;
$R^2$ represents hydrogen or alkyl group having 1 to 9 carbon atoms;
$R^3$ represents a saturated or unsaturated hydrocarbon group containing 6 to 18 carbon atoms; and
X represents a functional group selected from the group consisting of an aldehyde, a hydroxyl, a carboxylic acid, an acyl group, an amide and a monosaccharide having a glycosidic linkage.

R is preferably hydrogen. $R^2$ is preferably a hydrogen or methyl group. $R^3$ is preferably a hydrocarbon group containing 16 to 18 carbon atoms, more preferably 16 carbon atoms. Normally, $R^3$ will have one site that is unsaturated (C=C bond).

Preferably, the sophorolipids in the animal feed comprise at least 50% by weight sophorolipids having the general formula (2).

Preferably, the sophorolipid comprises at least 0.05 wt. % to 0.1 wt. % of the feed. For example, preferably 0.05 to 0.5 g of sophorolipid is included in 1 kg of feed (50 to 500 g per tonne of feed).

The sophorolipid may be added to the animal feed by itself. In a preferred embodiment, the sophorolipid is combined with a lysolecithin.

A second aspect of the present invention provides an ingredient, premix or supplement for an animal feed suitable for feeding mammals, birds and fish, comprising at least one sophorolipid the following general formulas (1) or (2):

(1)

(2)

wherein

R represents hydrogen or an acyl group having 1 to 4 carbon atoms;

$R^1$ represents hydrogen or an acetyl group;

$R^2$ represents hydrogen or alkyl group having 1 to 9 carbon atoms;

$R^3$ represents a saturated or unsaturated hydrocarbon group containing 6 to 18 carbon atoms; and X represents a functional group selected from the group consisting of an aldehyde, a hydroxyl, a carboxylic acid, an acyl group, an amide and a monosaccharide having a glycosidic linkage;

and wherein the dosage of said sophorolipid in said animal feed is 0.01 wt. % or higher, based on the total weight of said ingredient, premix or supplement, wherein said ingredient, premix or supplement further comprises at least one of vitamins, trace elements, minerals and organic acids.

Other surface active ingredients and/or emulsifiers may be included in the ingredient, premix or supplement according to the second aspect of the present invention.

Preferably, the second aspect of the present invention provides an ingredient, premix or supplement for an animal feed suitable for feeding mammals, birds and fish, comprising or consisting essentially of at least one sophorolipid having the following general formulas (1) or (2) above and at least one lysolecithin. More preferably, the supplement is at least 50% by weight lysolecithin, more preferably at least 75% by weight. The lysolecithin may comprise a blend of lecithins and lysolecithins, such as that sold under the proprietary name Lipidol.

A third aspect of the present invention provides a method for increasing the feed conversion rate in an animal comprising feeding a mammal, bird or fish with the animal feed according to the first aspect of the invention or with the ingredient, premix or supplement according to the second aspect of the invention.

In the context of this disclosure, the feed conversion rate (FCR) is a ratio or rate for measuring the efficiency with which animals, such as livestock, convert animal feed into a desired output. FCR is the mass of the input divided by the output (for example, kilos of feed per kilo of meat or milk). Animals with low FCR values are considered efficient users of feed.

A fourth aspect of the present invention relates to the use of a sophorolipid in the preparation of a feed supplement for the improvement of a feed conversion rate in an animal.

More preferably, at least one sophorolipid has the following general formulas (1) or (2):

wherein $R^1$ represents hydrogen or an acetyl group;

$R^2$ represents hydrogen or alkyl group having 1 to 9 carbon atoms; and $R^3$ represents a saturated or unsaturated hydrocarbon group containing 15 to 18 carbon atoms.

More preferably still, the fourth aspect of the present invention relates to the use of a sophorolipid and lysolecithin mix in the preparation of a feed supplement for the improvement of a feed conversion rate in an animal.

The animal feed may be suitable for any type of animal, such as mammals, birds, fish, reptiles, amphibians but preferably is a bird feed additive, especially poultry.

BRIEF DESCRIPTION OF THE DRAWINGS

Embodiments of the invention shall now be described, by way of example only, with reference to the accompanying drawings in which.

DETAILED DESCRIPTION

The present invention relates to the use of sophorolipids as an animal feed supplement. A sophorolipid is a surface-active glycolipid that can be synthesized by non-pathogenic yeasts, the main one being *Candida bombicola* using raw ingredients such as vegetable oils. Sophorolipids reduce surface tension and therefore are used as surfactants in detergents but also possess a number of useful biological activities including antimicrobial, virucidal, anticancer and inmuno-modulatory properties. Sophorolipids have previously been used for the treatment of skin and hair (see, for example, WO 95/34282 and U.S. Pat. No. 5,981,497).

The production of sophorolipids is well documented in the art, see for example, "Production of sophorolipids by the yeast *Candida bombicola* using simple and low cost fermentative media" Davery and Pakshirajan, Food Research International 42 (2009) 499-504.

Sophorolipids are comprised of a sugar head sophorose, an unusual β-(1,2) disaccharide consisting of two glucose molecules, covalently linked to a long chain hydroxylated fatty acid having a fatty acid chain length of 16-18 carbon atoms. Two types of esterification can occur which have a big effect on the molecule's behaviour, namely (i) acetylation and (ii) lactonization. Acetylation takes place at the C6' and C6" positions of the sophorose resulting in a mixture of non-, mono- and di-acetylated molecules. Acidic sophorolipids are not readily soluble in aqueous medium at acidic pH but become soluble at higher pH. However, these sophorolipids show instability at pH higher than 7.0. Lactonization converts the open-chain or acid sophorolipid to a closed-chain sophorolipid (lactonic form), specific for position C4", see below. The lactonised sophorolipids are stable across a wider pH range.

(i) Acidic Sophorolipid:

(ii) Lactonic Sophorolipid.

The present invention has surprisingly found that both acidic and lactonic sophorolipids may be added to animal feedstuffs to improve the performance of the animal. This is surprising because sophorolipids, especially the acidic form, would be expected to be destroyed by the stomach acid in the stomach of the animal thereby resulting in minimal, if any, effect on the bodyweight of the animal. Previously, oral administration of sophrolipids has not been considered due to it being readily hydrolyzed in the stomach as well as intestine. Natural sophorolipids containing around 50% of the acidic and lactonic forms may be used as the feed additive. The lactonic sophorolipids are preferred.

Example 1: Trial to Demonstrate Increased Animal Performance for Birds Treated with an Animal Feed Containing a Feed Additive According to an Embodiment of the Invention Comprising a Sophorolipid and Lysolecithin Mix Compared with a Control Group of Birds that Did not Receive the Animal Feed Additive Birds were fed identical diets over a period of 35 days but the diet of the treated birds was supplemented with 125 g of a sophorolipid/lysolecithin mix per ton of feed that has been cultivated from *C. bombicola*. 50% of the sophorolipid was in the lactonic form, thus the feed contained 62.5 g per ton of feed. The mix was 75% lysolecithins and 25% sophorolipids at a range of inclusion levels up to 250 ppm. The control and treated groups consisted each of replicates of 10 birds (total of 100 birds for each group). The three phases of the trial were BOOSTER (Day 1-14), STARTER (Day 15-28) and FINISHER (Day 35).

The data obtained for the control group and treated group are provided in the tables below:

I. Control Group.

| | Weight (kg) | | | |
|---|---|---|---|---|
| Rep | Initial | Booster | Starter | Finisher |
| 1 | 0.047 | 0.343 | 1.360 | 1.691 |
| 2 | 0.047 | 0.339 | 1.261 | 1.745 |
| 3 | 0.046 | 0.336 | 1.206 | 1.608 |
| 4 | 0.045 | 0.355 | 1.226 | 1.698 |
| 5 | 0.047 | 0.381 | 1.322 | 1.752 |
| 6 | 0.046 | 0.365 | 1.238 | 1.658 |
| 7 | 0.046 | 0.335 | 1.220 | 1.672 |
| 8 | 0.046 | 0.368 | 1.327 | 1.771 |

-continued

| Rep | Booster | Starter | Finisher | Total |
|---|---|---|---|---|
| 9 | 0.046 | 0.379 | 1.326 | 1.766 |
| 10 | 0.047 | 0.388 | 1.336 | 1.778 |
|  | 0.046 | 0.359 | 1.282 | 1.714 |

| Rep | Booster | Starter | Finisher | Total |
|---|---|---|---|---|
| Consumption (kg) | | | | |
| 1 | 0.465 | 1.437 | 0.963 | 2.865 |
| 2 | 0.446 | 1.463 | 1.002 | 2.911 |
| 3 | 0.463 | 1.387 | 0.919 | 2.769 |
| 4 | 0.455 | 1.434 | 0.996 | 2.885 |
| 5 | 0.482 | 1.461 | 0.940 | 2.882 |
| 6 | 0.460 | 1.409 | 1.057 | 2.926 |
| 7 | 0.528 | 1.440 | 0.936 | 2.903 |
| 8 | 0.468 | 1.523 | 1.013 | 3.003 |
| 9 | 0.500 | 1.540 | 0.925 | 2.965 |
| 10 | 0.495 | 1.476 | 1.089 | 3.060 |
|  | 0.476 | 1.457 | 0.984 | 2.917 |
| FCR | | | | |
| 1 | 1.569 | 1.413 | 2.905 | 1.742 |
| 2 | 1.528 | 1.587 | 2.068 | 1.714 |
| 3 | 1.597 | 1.594 | 2.286 | 1.772 |
| 4 | 1.468 | 1.647 | 2.108 | 1.745 |
| 5 | 1.443 | 1.551 | 2.187 | 1.690 |
| 6 | 1.444 | 1.614 | 2.511 | 1.815 |
| 7 | 1.827 | 1.626 | 2.070 | 1.785 |
| 8 | 1.452 | 1.588 | 2.280 | 1.741 |
| 9 | 1.500 | 1.626 | 2.100 | 1.723 |
| 10 | 1.448 | 1.557 | 2.464 | 1.767 |
|  | 1.523 | 1.578 | 2.278 | 1.749 |
| Weight Gain (kg) | | | | |
| 1 | 0.296 | 1.017 | 0.332 | 1.645 |
| 2 | 0.292 | 0.922 | 0.485 | 1.698 |
| 3 | 0.290 | 0.870 | 0.402 | 1.562 |
| 4 | 0.310 | 0.871 | 0.473 | 1.653 |
| 5 | 0.334 | 0.942 | 0.430 | 1.705 |
| 6 | 0.319 | 0.873 | 0.421 | 1.612 |
| 7 | 0.289 | 0.886 | 0.452 | 1.627 |
| 8 | 0.322 | 0.959 | 0.444 | 1.725 |
| 9 | 0.333 | 0.947 | 0.441 | 1.721 |
| 10 | 0.342 | 0.948 | 0.442 | 1.732 |
|  | 0.313 | 0.923 | 0.432 | 1.668 |

Dressing

| Rep | Dressing (%) | Weight |
|---|---|---|
| 1 | 80.000 | 1.400 |
| 2 | 76.744 | 1.650 |
| 3 | 77.778 | 1.400 |
| 4 | 78.378 | 1.450 |
| 5 | 78.947 | 1.500 |
| 6 | 80.000 | 1.400 |
| 7 | 75.00 | 1.350 |
| 8 | 77.143 | 1.350 |
| 9 | 76.923 | 1.500 |
| 10 | 75.676 | 1.400 |
|  | 84.020 | 1.440 |

II Treated Group

| Rep | Weight (kg) | | | |
|---|---|---|---|---|
|  | Initial | Booster | Starter | Finisher |
| 1 | 0.046 | 0.341 | 1.305 | 1.733 |
| 2 | 0.046 | 0.345 | 1.197 | 1.648 |
| 3 | 0.045 | 0.364 | 1.290 | 1.711 |
| 4 | 0.045 | 0.322 | 1.215 | 1.726 |
| 5 | 0.047 | 0.368 | 1.227 | 1.638 |
| 6 | 0.047 | 0.362 | 1.294 | 1.766 |
| 7 | 0.046 | 0.382 | 1.262 | 1.716 |
| 8 | 0.047 | 0.349 | 1.219 | 1.736 |
| 9 | 0.046 | 0.339 | 1.237 | 1.743 |
| 10 | 0.047 | 0.369 | 1.241 | 1.653 |
|  | 0.046 | 0.354 | 1.248 | 1.70 |

| Rep | Booster | Starter | Finisher | Total |
|---|---|---|---|---|
| Consumption (kg) | | | | |
| 1 | 0.505 | 1.506 | 0.935 | 2.945 |
| 2 | 0.430 | 1.398 | 0.933 | 2.760 |
| 3 | 0.456 | 1.506 | 0.954 | 2.916 |
| 4 | 0.418 | 1.446 | 1.029 | 2.893 |
| 5 | 0.508 | 1.413 | 0.937 | 2.858 |
| 6 | 0.479 | 1.460 | 0.940 | 2.879 |
| 7 | 0.533 | 1.451 | 0.929 | 2.913 |
| 8 | 0.444 | 1.456 | 0.995 | 2.894 |
| 9 | 0.426 | 1.428 | 1.027 | 2.881 |
| 10 | 0.504 | 1.392 | 0.904 | 2.799 |
|  | 0.470 | 1.445 | 0.958 | 2.874 |
| FCR | | | | |
| 1 | 1.710 | 1.562 | 2.183 | 1.745 |
| 2 | 1.438 | 1.639 | 2.070 | 1.723 |
| 3 | 1.428 | 1.626 | 2.263 | 1.749 |
| 4 | 1.506 | 1.619 | 2.014 | 1.720 |
| 5 | 1.581 | 1.644 | 2.279 | 1.795 |
| 6 | 1.518 | 1.567 | 1.994 | 1.675 |
| 7 | 1.585 | 1.649 | 2.046 | 1.744 |
| 8 | 1.470 | 1.673 | 1.922 | 1.713 |
| 9 | 1.452 | 1.590 | 2.030 | 1.697 |
| 10 | 1.565 | 1.595 | 2.193 | 1.742 |
|  | 1.526 | 1.615 | 2.090 | 1.730 |
| Weight Gain (kg) | | | | |
| 1 | 0.295 | 0.964 | 0.428 | 1.687 |
| 2 | 0.299 | 0.853 | 0.451 | 1.602 |
| 3 | 0.319 | 0.926 | 0.422 | 1.667 |
| 4 | 0.278 | 0.893 | 0.511 | 1.682 |
| 5 | 0.321 | 0.859 | 0.411 | 1.592 |
| 6 | 0.316 | 0.932 | 0.472 | 1.719 |
| 7 | 0.336 | 0.880 | 0.454 | 1.670 |
| 8 | 0.302 | 0.870 | 0.518 | 1.690 |
| 9 | 0.293 | 0.898 | 0.506 | 1.697 |
| 10 | 0.322 | 0.873 | 0.412 | 1.607 |
|  | 0.308 | 0.895 | 0.458 | 1.661 |

Dressing

| Rep | Dressing (%) | Weight |
|---|---|---|
| 1 | 82.051 | 1.600 |
| 2 | 78.378 | 1.450 |
| 3 | 77.778 | 1.400 |
| 4 | 77.778 | 1.400 |
| 5 | 80.000 | 1.400 |
| 6 | 80.000 | 1.600 |
| 7 | 77.778 | 1.400 |
| 8 | 75.676 | 1.400 |
| 9 | 75.000 | 1.350 |
| 10 | 77.778 | 1.400 |
|  | 84.368 | 1.440 |

These results are shown graphically in FIGS. 1 to 6 of the accompanying drawings, with the line charts presenting the 10 replicates' results ranked from highest to lowest to demonstrate the consistency of the treated group compared with the control group.

The overall conversion ratio or rate (FCR) was shown to be lower in the treated group than the control group (see FIGS. 1 to 3), most notably during the finisher phase, indicating that the treated group are more efficient converters of their food. The benefit of the feed additive can also be seen in the final bodyweight of the two groups, which was broadly the same, and the lower consumption for the treated group compared to the control group (see FIGS. 4 and 5). The dressing percentage was also higher in the treated group (see FIG. 6).

Modifications to the sophorolipid molecules have also been carried out in the art and such modified sophorolipids are also suitable for use in the animal feed supplement according to the invention. Examples of such modified sophorolipids are given below (i to vii). Their methods of production are described in articles, such as "Enzymatic Synthesis of a Galactopyranose Sophorolipid Fatty Acid Ester" Nunez, Foglia and Ashby, Biotechnology Letters (2003) 25: 1291-1297 and "Enzyme-catalyzed regioselective transesterification of peracylated sophorolipids" Carr and Bisht, Tetrahedron 59 (2003) 7713-7724.

Example 2: Trial to Demonstrate Increased Animal Performance for Birds Treated with an Animal Feed Containing a Feed Additive According to Another Embodiment of the Invention Comprising Sophorolipids Only Compared with a Control Group of Birds that Did not Receive the Animal Feed Additive Another trial was carried out in a similar manner to Example 1 above with control and treated groups of birds with the birds being fed identical experimental diets over a period of 35 days but the diet of the treated birds was supplemented with a pure sophorolipid (SPL) supplement at a range of inclusion levels up to 250 ppm. The sophorolipid was provided as a powder with 50% sophorolipids liquid with 50% silicon dioxide.

The composition of the Experimental diet is provided below:

|  | Starter | Grower | Finisher |
| --- | --- | --- | --- |
| Ingredients |  |  |  |
| Corn (3 mm) | 52.45 |  |  |
| Corn (5 mm) |  | 39.99 | 18.60 |
| Corn (7 mm) |  | 8.00 | 40.00 |
| SBM (de-hulled) | 39.15 | 35.55 | 32.05 |
| Soy Oil | 3.59 | 4.36 | 5.33 |
| L-Lysine Sulfate 55 | 0.31 | 0.21 | 0.21 |
| DL-Met 98 | 0.38 |  |  |
| L-Met 99 |  | 0.32 | 0.31 |
| Threonine 98 | 0.10 | 0.07 | 0.06 |
| Choline Chloride 50 | 0.07 | 0.07 | 0.08 |
| MCP | 1.75 |  |  |
| MDCP |  | 1.68 | 1.60 |
| Limestone (Fine) | 1.54 | 1.25 | 1.10 |
| Salt | 0.30 | 0.25 | 0.25 |
| NaHCO$_3$ | 0.10 | 0.19 | 0.19 |
| Vit Premix-Broiler | 0.14 | 0.14 | 0.12 |
| Min Premix-Poultry | 0.11 | 0.11 | 0.11 |
| Total | 100.00 | 100.00 | 100.00 |
| Calculated values (%) |  |  |  |
| AME$_n$ (kcal/kg) | 3,000 | 3,100 | 3,200 |
| CP | 23.00 | 21.50 | 20.00 |
| Lys | 1.44 | 1.29 | 1.19 |
| Met | 0.71 | 0.64 | 0.61 |
| Met + Cys | 1.08 | 0.99 | 0.94 |
| Ca | 0.96 | 0.87 | 0.81 |
| Available P | 0.48 | 0.43 | 0.41 |

Results: Effect of Pure SPLs on Growth Performance in Broilers.

Table 1 below provides the average daily gain (ADG) (g) for the control and treated birds.

TABLE 1

|  | Days 1-7 | Days 7-21 | Days 21-35 | Overall |
| --- | --- | --- | --- | --- |
| Control | 12.7 | 34.5 | 103.2 | 57.6 |
| SPL (25 ppm) | 12.3 | 39.5 | 111.0 | 62.7 |
| SPL (50-ppm) | 12.0 | 35.1 | 102.0 | 57.2 |
| SPL (100 ppm) | 11.8 | 35.7 | 105.3 | 58.8 |
| SPL (250 ppm) | 11.8 | 35.0 | 99.8 | 56.3 |

Table 2 below provides the feed intake (FI) (g) for the control and treated birds.

TABLE 2

|  | Days 1-7 | Days 7-21 | Days 21-35 | Overall |
| --- | --- | --- | --- | --- |
| Control | 34.5 | 84.9 | 141.3 | 101.9 |
| SPL (25 ppm) | 34.2 | 92.7 | 144.9 | 106.7 |
| SPL (50-ppm) | 33.9 | 78.6 | 142.8 | 101.5 |
| SPL (100 ppm) | 33.9 | 80.5 | 138.6 | 98.7 |
| SPL (250 ppm) | 33.6 | 80.8 | 136.6 | 98.0 |

Table 3 below provides the feed efficiency (FE) (g) for the control and treated birds.

TABLE 3

|  | Days 1-7 | Days 7-21 | Days 21-35 | Overall |
| --- | --- | --- | --- | --- |
| Control | 0.37 | 0.41 | 0.73 | 0.57 |
| SPL (25 ppm) | 0.36 | 0.43 | 0.77 | 0.59 |
| SPL (50-ppm) | 0.35 | 0.45 | 0.71 | 0.57 |
| SPL (100 ppm) | 0.35 | 0.46 | 0.76 | 0.60 |
| SPL (250 ppm) | 0.35 | 0.45 | 0.73 | 0.58 |

Examples 1 and 2 above demonstrate that sophorolipids, both alone and in combination with lysolecithin, enhance the feed conversion rate of animals. Example 2 shows that the incorporation of 25-250 ppm pure sophorolipid into an animal feed consistently improves the FCR of the animal compared with the control birds, particularly during the first 8-21 days of the trial, as illustrated in the Table 4 below and shown graphically in FIGS. 7 to 10:

TABLE 4

|  | Days 1-7 | Days 8-21 | Days 22-35 | Total |
| --- | --- | --- | --- | --- |
| Control | 2.717 | 2.461 | 1.369 | 1.690 |
| 25 ppm | 2.780 | 2.347 | 1.305 | 1..626 |
| 50 ppm | 2.825 | 2.239 | 1.400 | 1.666 |
| 100 ppm | 2.873 | 2.255 | 1.316 | 1.607 |
| 250 ppm | 2.847 | 2.309 | 1.369 | 1.665 |

Figure 1:
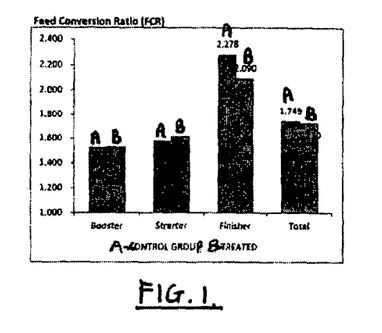
FIG. 1 is a bar chart illustrating Feed Conversion Ratio for birds treated with a feed additive of Example 1 of the present invention and a control group.
Figure 2:
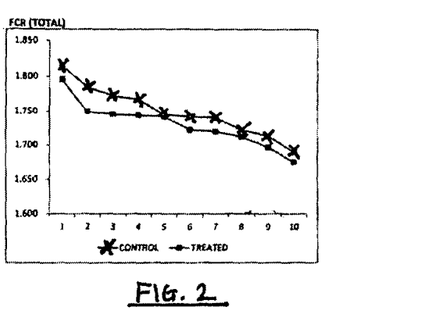
FIG. 2 is a graph of the total Feed Conversion Ratio for control and treated groups of birds of Example 1.
Figure 3:
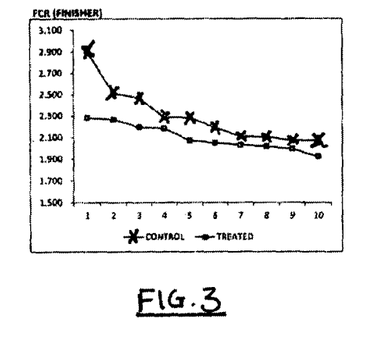
FIG. 3 is a graph of the Feed Conversion Ratio for control and treated groups of birds of Example 1 on the final day (Day 35)
Figure 4:
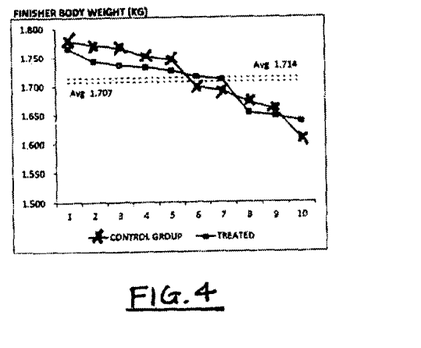
FIG. 4 is a graph of the finisher body weight in kilograms (Day 35) for control and treated groups of birds of Example 1.
Figure 5:
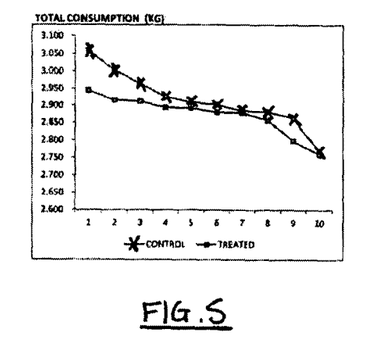
FIG. 5 is a graph of the total consumption in kilograms for control and treated groups of birds of Example 1.
Figure 6:
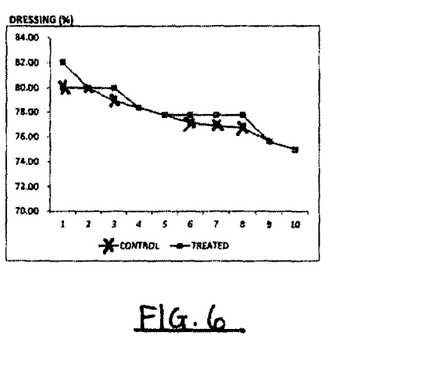
FIG. 6 is a graph of percentage dressing for control and treated groups of birds of Example 1.
Figure 7:
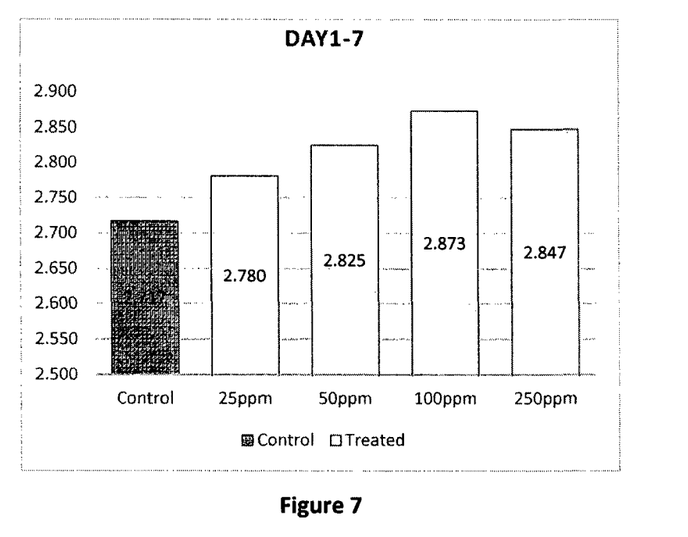
FIG. 7 is a bar chart illustrating Feed Conversion Ratio at Days 1-7 for birds treated with a feed additive of Example 2 of the present invention and a control group.
Figure 8:
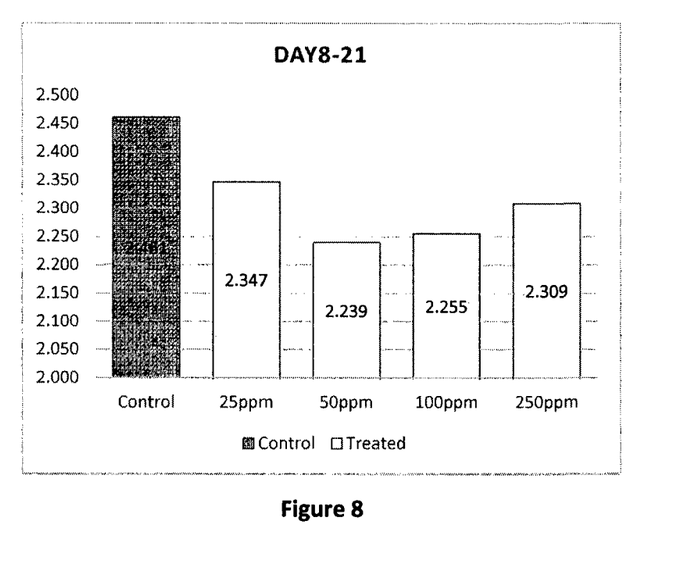
FIG. 8 is a bar chart illustrating Feed Conversion Ratio at Days 8-21 for birds treated with a feed additive of Example 2 of the present invention and a control group.
Figure 9:
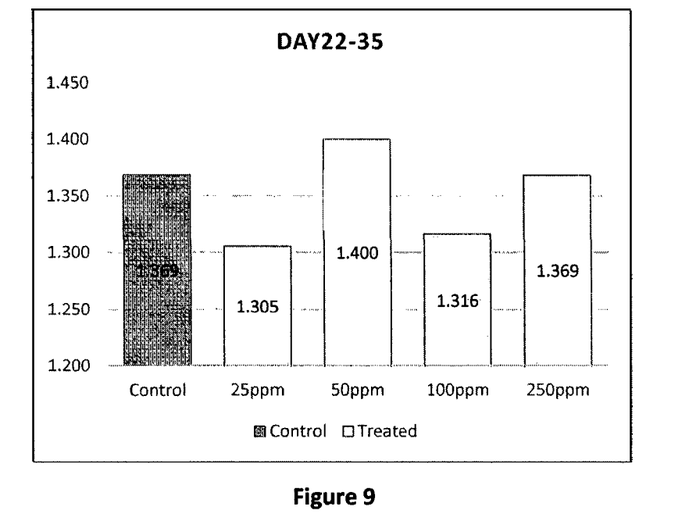
FIG. 9 is a bar chart illustrating Feed Conversion Ratio at Days 22-35 for birds treated with a feed additive of Example 2 of the present invention and a control group.
Figure 10:
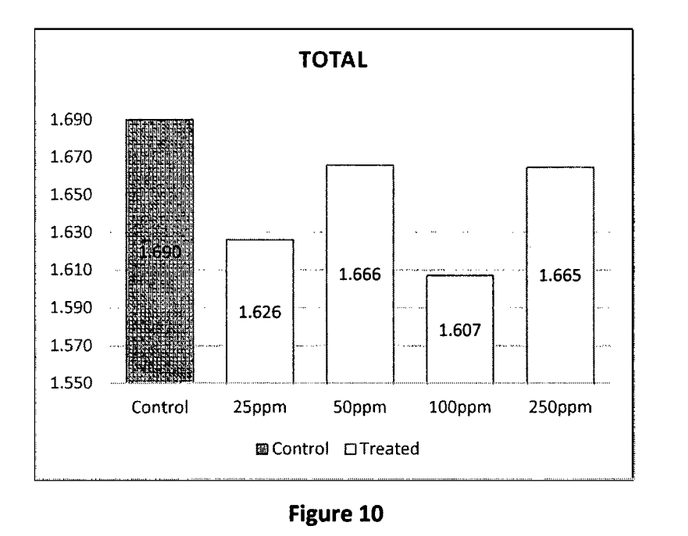
FIG. 10 is a bar chart illustrating the total FCR for birds treated with a feed additive of Example 2 of the present invention and a control group of birds.

However, the incorporation of a lysolecithin blend and sophorolipid mix (250 ppm) into the animal feed provided better improvement in the FCR relative to the control birds over the entire 35 day trial, as illustrated in Table 5 below and shown graphically in FIG. 1 of the accompanying drawings:

TABLE 5

|  | Days 1-14 | Days 15-28 | Days 29-35 | Total |
| --- | --- | --- | --- | --- |
| Control | 1.540 | 1.602 | 2.153 | 1.738 |
| Treated | 1.526 | 1.615 | 2.090 | 1.730 |

Thus, this indicates that a lysolecithin/sophorolipid mix provides an improved animal feed supplement. While the inventor does not wish to be bound to the theory, it is believed that the improvement may be due to the different HLB values of the lipids. The HLB value provides an indication of the size of the hydrophilic portion of molecule relative to the molecular mass of the entire molecule. The HLB value of sophorolipids is higher than lysolecithins, thus the overall HLB value of the combination will be pushed upward. As a result, a mixture should improve the emulsification of oil-in water mixtures, as found in the gut of an animal.

Lecithins, particularly lysolecithins or hydrolysed lecithins may therefore be combined with one or more sophorolipids to provide an animal feed supplement according to the present invention. Various types of lecithin or lysolecithin may be used, including blends thereof. Lecithin is a generic term which applies to any complex mixture of lipids containing phosphoric acid, choline, fatty acids, glycerol, glycolipids, triglycerides and phospholipids, including phosphatidycholine, phosphatidylethanolamine, phosphatidylinositol. More preferably, the lecithin blend includes at least one hydrolysed phospholipid wherein one of the fatty acid chains of the phospholipid is hydrolysed and substituted with hydrogen to yield a lysophospholipid.

A preferred lysolecithin for use in the present invention is that sold under the proprietary name of Lipidol, consisting of lecithins and lysolecithins having the following phospholipid profile:

| Phospholipid | Weight % |
| --- | --- |
| 1-Lysophosphatidylcholine | 0.6 |
| 2-Lysophosphatidylcholine | 6.5 |
| Lysophosphatidylinositol | 2.1 |
| Lysophosphatidylethanolamine | 3.9 |
| Phosphatidylinositol | 8.0 |
| Lysophosphatidic acid | 1.9 |
| Phosphatidylcholine | 3.7 |
| Phosphatidic acid | 0.6 |
| N-Acylphosphatidylethanolamine | 0.4 |
| Phosphatidylethanolamine | 1.7 |
| Other minor phospholipids | 3.9 |
| TOTAL PHOSPHOLIPIDS | 33.3 |

The invention claimed is:

1. A supplement composition consisting essentially of: (i) at least one sophorolipid having the following general formulas (1) or (2):

wherein

R represents hydrogen or an acyl group having 1 to 4 carbon atoms;

$R^1$ represents hydrogen or an acetyl group;

$R^2$ represents hydrogen or alkyl group having 1 to 9 carbon atoms;

$R^3$ represents a saturated or unsaturated hydrocarbon group containing 6 to 18 carbon atoms; and X represents a functional group selected from the group consisting of an aldehyde, a hydroxyl, a carboxylic acid, an acyl group, an amide and a monosaccharide having a glycosidic linkage; and (ii) an amorphous silicon dioxide, wherein the supplement composition is a powder and wherein the at least one sophorolipid and the amorphous silicon dioxide in the supplement composition are present in a 1:1 ratio, and wherein the supplement composition is suitable for an animal feed.

2. The supplement composition as claimed in claim 1 wherein the at least one sophorolipid has the general formula (1) or (2) below:

(2)

wherein

R¹ represents hydrogen or an acetyl group;

R² represents hydrogen or alkyl group having 1 to 9 carbon atoms; and

R³ represents a saturated or unsaturated hydrocarbon group containing 15 to 18 carbon atoms.

3. The supplement composition as claimed in claim 1 wherein R² is a hydrogen or a methyl group.

4. The supplement composition as claimed in claim 1, wherein R³ is a hydrocarbon group containing 16 to 18 carbon atoms.

5. The supplement composition as claimed in claim 1 wherein R³ has one site that is unsaturated (C=C bond).

6. An ingredient, premix or supplement composition, said composition consisting essentially of: (i) at least one sophorolipid the following general formulas (1) or (2):

(1)

(2)

wherein

R represents hydrogen or an acyl group having 1 to 4 carbon atoms;

R¹ represents hydrogen or an acetyl group;

R² represents hydrogen or alkyl group having 1 to 9 carbon atoms;

R³ represents a saturated or unsaturated hydrocarbon group containing 6 to 18 carbon atoms; and

X represents a functional group selected from the group consisting of an aldehyde, a hydroxyl, a carboxylic acid, an acyl group, an amide and a monosaccharide having a glycosidic linkage; (ii) and an amorphous silicon dioxide, wherein the composition is a powder, and wherein the at least one sophorolipid and the amorphous silicon dioxide in the composition are present in a ratio of 1:1 and wherein the dosage of said sophorolipid in said composition is 0.01 wt. % or higher, based on the total weight of said ingredient, premix or supplement; and (iii) at least one of vitamins, trace elements, minerals and organic acids, and wherein the composition is suitable for an animal feed.

7. The composition as claimed in claim 6, wherein the at least one sophorolipid includes at least one sophorolipid of the following general formulas (1) or (2):

(1)

-continued (2)

wherein
R¹ represents hydrogen or an acetyl group;
R² represents hydrogen or alkyl group having 1 to 9 carbon atoms; and
R³ represents a saturated or unsaturated hydrocarbon group containing 15 to 18 carbon atoms;
and wherein the dosage of said sophorolipid in said animal feed composition is 0.01 wt. % or higher, based on the total weight of said animal feed composition, wherein said animal feed composition further comprises vitamins, trace elements, minerals and organic acids.

8. The composition as claimed in claim 6, wherein the composition is suitable for feeding mammals, birds and fish.

9. The supplement composition as claimed in claim 1, wherein the supplement composition is suitable for feeding mammals, birds and fish.

10. A method for increasing the feed conversion rate in an animal comprising feeding a mammal, bird or fish with the supplement composition according to claim 9.

11. A method for increasing feed conversion rate in an animal comprising feeding a mammal, bird or fish with the composition according to claim 8.

* * * * *